Nov. 20, 1962　　　P. E. BUTLER　　　3,064,903
VARIABLE AREA FUEL INJECTOR
Filed Sept. 12, 1961　　　2 Sheets-Sheet 1

INVENTOR.
Paul Eugene Butler
BY
E. W. Christen
ATTORNEY

Nov. 20, 1962  P. E. BUTLER  3,064,903
VARIABLE AREA FUEL INJECTOR
Filed Sept. 12, 1961  2 Sheets-Sheet 2

INVENTOR.
Paul Eugene Butler
BY
E. W. Christen
ATTORNEY

United States Patent Office 3,064,903
Patented Nov. 20, 1962

3,064,903
VARIABLE AREA FUEL INJECTOR
Paul Eugene Butler, Lansing, Mich., assignor to General Motors Corporation, Detroit, Mich., a corporation of Delaware
Filed Sept. 12, 1961, Ser. No. 137,664
6 Claims. (Cl. 239—76)

This invention relates to fuel injectors and more particularly to a fuel injector that utilizes a plurality of variable area fuel nozzles.

Variable thrust liquid propellant rocket motors and other types of combustion chambers many times employ a plurality of variable area fuel nozzles. It is desirable that the flow rates through such nozzles be maintained in equilibrium, and this has been difficult to achieve.

The object of the invention is to provide a variable area multiple nozzle fuel injector that will maintain equality of flow in a dependable manner.

The invention provides a combustion chamber fuel injector wherein a plurality of fuel nozzles are provided with a single piston control means to mechanically vary the discharge areas of all of the fuel nozzles in unison.

Other objects and features of the invention will be apparent from the description which follows and from the accompanying drawings.

Figure 1:
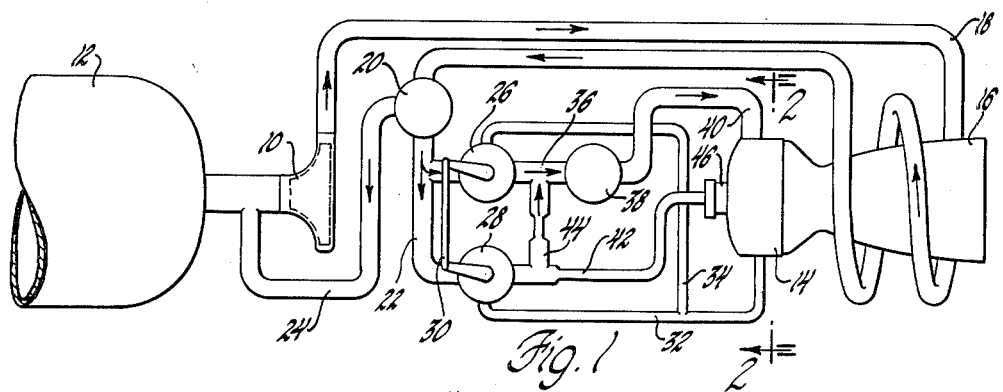
FIGURE 1 is a schematic view of a monopropellant rocket engine employing one form of the invention.

Referring to FIGURE 1, a centrifugal fuel pump 10 receives a suitable fuel, such as liquid hydrogen or hydrogen peroxide, from a fuel tank 12 for delivery to a combustion chamber 14 of a rocket engine 16. A conduit 18 leads the fuel from the pump 10 around the rocket engine for cooling purposes and delivers it to a fuel bypass valve 20 which delivers fuel at desired discharge pressures to a conduit 22, any excess fuel being returned to the pump inlet by conduit 24. The conduit 22 feeds a pair of valves 26 and 28 which are mechanically connected by linkage 30 which is manually or otherwise operated to program rocket thrust. The valves 26 and 28 are conventional and are connected by conduits 32 and 34 to the gas pressure of the combustion chamber and are modulated by such pressure. The liquid fuel flow to the injector is through a conduit 36, an on-off valve 38 and a conduit 40. A conduit 42 transmits a control pressure to the injector to regulate the discharge area of the fuel nozzles but does not deliver fuel for combustion. The conduit 42 is connected to the conduit 36 by a restricted passage 44.

The valve 26 is so modulated that increasing combustion pressure moves the valve in closing direction to reduce the pressure of the fuel fed to the combustion chamber. The valve 28 is so modulated that decreasing combustion pressure moves the valve toward closing position to reduce the control pressure in the conduit 42 and increase the discharge area of the nozzles. When the combustion pressure increases, the valve 28 moves in opening direction to increase the control pressure and thus reduce the discharge area of the fuel nozzles.

Figure 3:
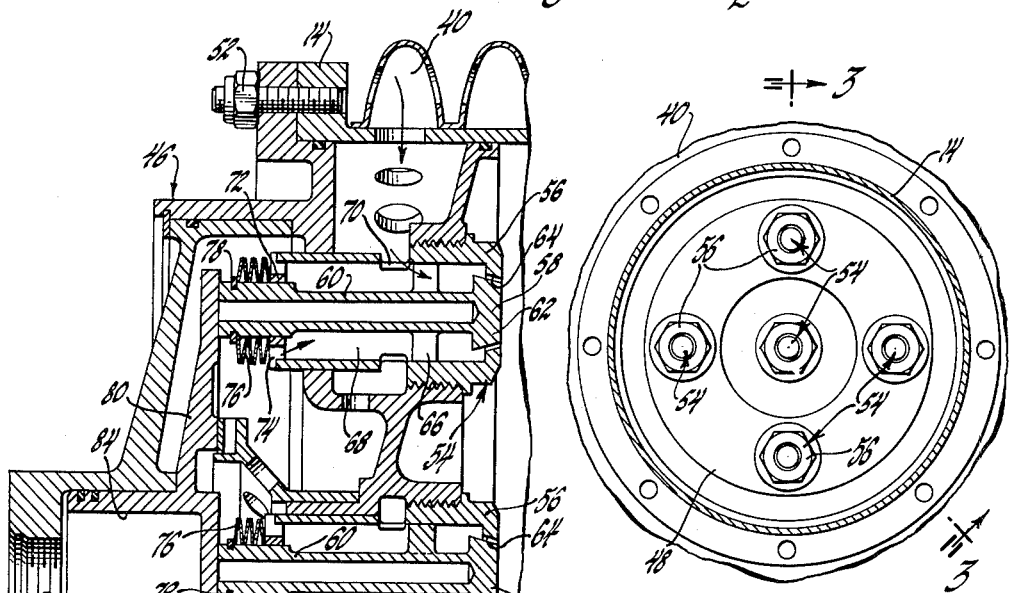
FIGURE 3 is a sectional view of the combustion chamber and fuel injector utilizing monopropellant fuel and taken in the direction indicated by the line 3—3 of FIGURE 2.
Figure 2:
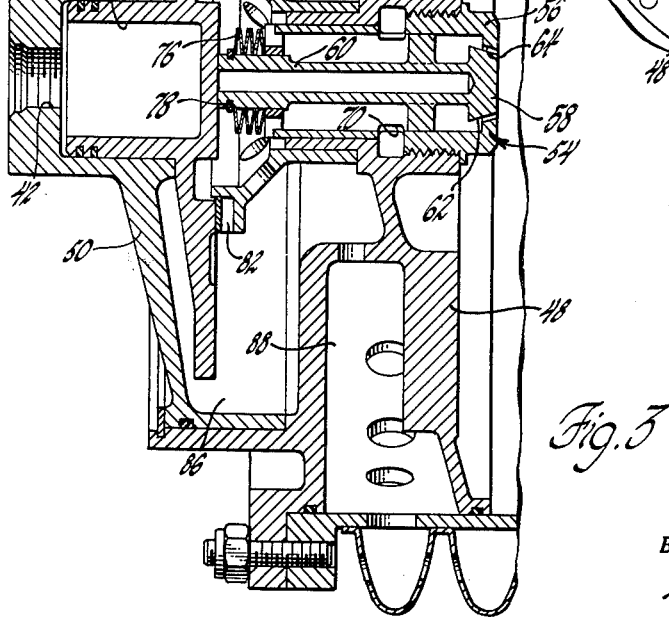
FIGURE 2 is a cross section of the rocket engine combustion chamber taken along the plane indicated by the line 2—2 of FIGURE 1.

Referring to FIGURES 2 and 3, the combustion chamber 14 has a fuel injector 46 located in the end wall thereof. The fuel injector includes a fuel feed disc 48 and a control pressure cylinder 50 secured to the combustion chamber by bolts 52. The fuel feed disc has a plurality of nozzles 54 mounted therein. Each of the nozzles includes a valve body or casing 56 which is secured to the disc 48 and a reciprocal plug valve 58 in the body. The valve 58 has a stem portion 60 and a conical head 62 that cooperates with a conical valve seat 64 in the casing. Movement of the valve head 62 to the right will shut off the propellant flow while movement to the left will cause increasingly greater nozzle discharge area.

Radial ribs 66 support the valve 58 for sliding movement in the casing fuel passage 68 which receives fuel through bores 70. A ring 72 is slideably mounted on the valve stem 60 and in the casing 56 by plurality of radial arms 74. The ring 72 engages Belleville springs 76 which abut a snap ring 78 secured to the valve stem 60 that abuts a reciprocable control piston 80.

The control piston 80 is biased to the left by a wave spring 82 and is subject to the difference in pressures of the fuel delivered by the conduits 40 and 42. The conduit 42 delivers control fuel pressure to the chamber 84 on the left side of the control piston 80 and this pressure acts against the pressure of the combustion fuel on the right side of the control piston as well as against the wave spring 82 and the Belleville springs 76 of each of the fuel nozzles 54. A sufficient increase in control pressure over fuel-in pressure will move the control piston 80 to the right and thus shift the valves 58 to shut off fuel flow through the nozzle. With decreasing pressures in the chamber 84, the control piston will move full left and the Belleville springs 76 will cause the valve 58 to follow the control piston until the head 62 is in full open position as shown.

It will be noted that the fuel intake conduit 40 feeds the chambers 86 and 88 formed by the fuel feed disc 48 and pressure disc 50 so that all of the nozzles 54 are subject to a common inlet fuel pressure condition. Since the plug valves 58 each contact the same control piston 80 their movement will be uniform and this, in conjunction with the common inlet, provides a simultaneously controlled injection of fuel with equilibrium between the nozzles.

Figure 4:
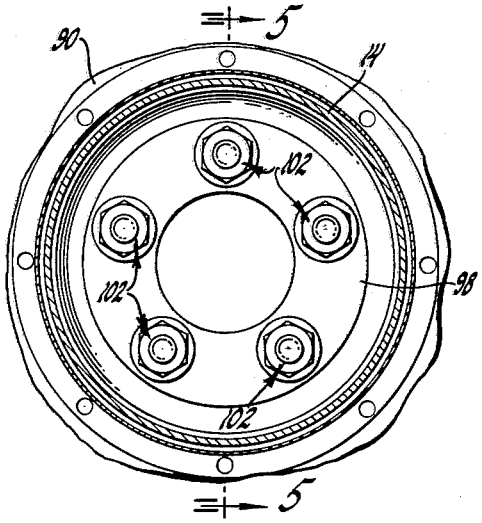
FIGURE 4 is a view similar to that of FIGURE 2, but of a combustion chamber and injector employing a bi-propellant.
Figure 5:
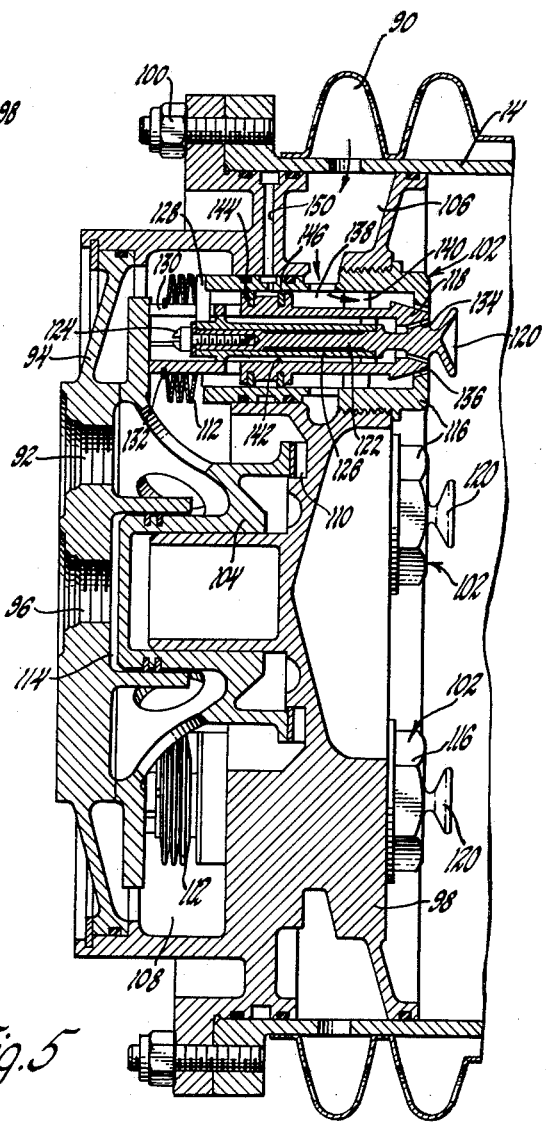
FIGURE 5 is a sectional view of the combustion chamber utilizing the bi-propellant fuel injector and taken along the plane indicated by the line 5—5 of FIGURE 4.

The bi-propellant fuel injector shown in FIGURES 4 and 5 can utilize suitable fuels such as UDMH (unsymmetrical dimethyl hydrazine) and $N_2O_4$ (nitrous tetroxide). The $N_2O_4$ is supplied to the combustion chamber 14 by a conduit 90 and the UDMH is supplied to the combustion chamber by a conduit 92 in the control pressure cylinder 94. The UDMH is also used as the control pressure fluid and is supplied to the cylinder 94 by passage 96. The cylinder 94 and a fuel feed disc are secured to the combustion chamber 14 by bolts 100 and form the end wall of the chamber. A plurality of nozzles 102 are mounted in the fuel feed disc 98 and the cylinder 94 carries a control pressure piston 104. The $N_2O_4$ is fed to all of the nozzles 102 by an annular chamber 106 in the fuel feed disc 98, and the UDMH is fed to all of the nozzles by another annular chamber 108 on the other side of the disc 98.

The control piston 104 acts against a wave spring 110 and nozzle Belleville springs 112 to shut off the flow of both propellants when the UDMH control pressure in the chamber 114 sufficiently exceeds the spring pressures and UDMH pressure in the chamber 108. The nozzles 102 have a fixed outer casing 116 and a movable valve plug 118 which is reciprocal about a fixed core 120. The core 120 has a central stem portion 122 to which is secured, by a screw 124, a sleeve 126. The sleeve 126 has radial arms 128 which engage the casing 116 and which bear against the Belleville springs 112. The valve plug 118 abuts the control piston 104 and has slots 130 for passage of the arms 128. A snap ring 132 engages the springs 112 and the valve 118 is thus biased against the control piston 104.

The head of the valve 118 has a central conical bore 134 which forms an inner discharge passage with a complementary conical seat on the core 120 and the casing 116 has a conical bore 136 which forms an outer discharge passage in conjunction with a conical shoulder on the valve head. A sufficient increase in control pressure will thus move the control piston 104 and plug 118 to the right to shut off the bi-propellant flow. The valve is shown in full open position and it is seen that the $N_2O_4$ passes from the chamber 106 to a chamber 138 formed between the nozzle casing and valve plug, past radial locating arms 140 on the valve plug and out the bore 136. The UDMH is discharged by way of the chamber 108 past the radial arms 128 and into a chamber 142 formed between the core 120 and valve plug 118 and thence out the bore 134.

As in the monopropellant injector, it is seen that the bi-propellant injector provides a plurality of nozzles each of which are fed from a common fuel source and each of which are operated by a single control piston. The two propellants should not mix prior to entering the combustion chamber, and the plug valve 118 is accordingly provided with piston rings 144 and 146 to separate the propellants in the nozzle casings. A passage 150 may be utilized to feed helium under pressure to the annular space between the rings to prevent intermingling of the fuels.

While the preferred embodiment of the invention has been described fully in order to explain the principles of the invention, it is to be understood that modifications of structure may be made by the exercise of skill, in the art within the scope of the invention which is not to be regarded as limited by the detailed description of the preferred embodiment.

I claim:

1. A fuel injector including a housing having a fuel supply chamber adapted to receive fuel under pressure, a piston movable in the housing and forming an expansible chamber therewith adapted to receive a control fluid under pressure, spring means biasing the piston in opposition to the control pressure, a plurality of fuel nozzles in the housing each including a movable valve member and a valve body fixed to the housing, the valve body and valve member forming a variable area fuel flow control port for regulating fuel discharge from the supply chamber, and means connecting all of the valve members to the piston for unified movement therewith to provide balanced fuel injection from the nozzles, the valve members serving to close the fuel flow control ports on increase in control pressure.

2. A fuel injector including a housing having a fuel supply chamber adapted to receive fuel under pressure, a piston movable in the housing and forming an expansible chamber therewith adapted to receive a control fluid under pressure, spring means biasing the piston, a plurality of fuel nozzles in the housing each including a movable valve member and a valve body fixed to the housing, the valve body and valve member forming a variable area fuel flow control port for regulating fuel discharge from the supply chamber, means connecting all of the valve members to the piston for unified movement therewith to provide balanced fuel injection from the nozzles, and spring means biasing each valve member in opening direction and against the piston.

3. A fuel injector including a housing having a fuel supply chamber adapted to receive fuel under pressure, a piston movable in the housing and forming an expansible chamber therewith adapted to receive a control fluid under pressure, spring means biasing the piston, a plurality of fuel nozzles in the housing each including a movable valve member and a valve body fixed to the housing, the valve body and valve member forming a variable area fuel flow control port for regulating fuel discharge from the supply chamber, the control fluid being the same fluid as the fuel supplied to the nozzles, and means connecting all of the valve members to the piston for unified movement therewith to provide balanced fuel injection from the nozzles.

4. A fuel injector including a housing having first and second fuel supply chambers adapted to receive different fuels under pressure, a piston movable in the housing and forming an expansible chamber therewith adapted to receive a control fluid under pressure, spring means biasing the piston in opposition to the control pressure, and a plurailty of fuel nozzles in the housing each communicating with the first and second supply chambers, each nozzle including a valve body fixed to the housing and a movable valve member forming therewith first and second variable area fuel flow control ports for individually regulating fuel discharge from the first and second supply chambers, and means connecting all of the valve members to the piston for unified movement therewith to provide balanced fuel injection from the nozzles, the valve members serving to close the first and second fuel flow control ports on increase in control pressure.

5. A fuel injector including a housing having first and second fuel supply chambers adapted to receive different fuels under pressure, a piston movable in the housing and forming an expansible chamber therewith adapted to receive a control fluid under pressure, spring means biasing the piston, and a plurality of fuel nozzles in the housing each communicating with the first and second supply chambers, each nozzle including a valve body fixed to the housing and a movable valve member forming therewith first and second variable area fuel flow control ports for individually regulating fuel discharge from the first and second supply chambers, means connecting all of the valve members to the piston for unified movement therewith to provide balanced fuel injection from the nozzles, and spring means biasing each valve member in opening direction and against the piston.

6. A fuel injector including a housing having first and second fuel supply chambers adapted to receive different fuels under pressure, a piston movable in the housing and forming an expansible chamber therewith adapted to receive a control fluid under pressure, spring means biasing the piston, and a plurality of fuel nozzles in the housing each communicating with the first and second supply chambers, each nozzle including a valve body fixed to the housing and a movable valve member forming therewith first and second variable area fuel flow control ports for individually regulating fuel discharge from the first and second supply chambers, the control fluid being the same fluid as one of the fuels supplied to the nozzles, and means connecting all of the valve members to the piston for unified movement therewith to provide balanced fuel injection from the nozzles.

References Cited in the file of this patent

UNITED STATES PATENTS

| | | |
|---|---|---|
| 2,296,079 | Anderson | Sept. 15, 1942 |
| 2,777,466 | Ericson | Jan. 15, 1957 |